(12) United States Patent
Wittrisch

(10) Patent No.: US 7,400,811 B2
(45) Date of Patent: Jul. 15, 2008

(54) SEALED FEEDTHROUGH ASSEMBLY FOR OPTICAL FIBER

(75) Inventor: Christian Wittrisch, Rueil Malmaison (FR)

(73) Assignee: Institut Francais du Petrole, Malmaison Cedex (FR)

( * ) Notice: Subject to any disclaimer, the term of this patent is extended or adjusted under 35 U.S.C. 154(b) by 0 days.

(21) Appl. No.: 11/373,175

(22) Filed: Mar. 13, 2006

(65) Prior Publication Data

US 2006/0210231 A1  Sep. 21, 2006

(30) Foreign Application Priority Data

Mar. 16, 2005  (FR) ................... 05 02619

(51) Int. Cl.
*G02B 6/00* (2006.01)

(52) U.S. Cl. .................. 385/134; 385/135; 385/138

(58) Field of Classification Search ............. 385/138, 385/134, 135, 136, 137, 55, 56, 58, 62, 95, 385/99

See application file for complete search history.

(56) References Cited

U.S. PATENT DOCUMENTS

| | | | | |
|---|---|---|---|---|
| 3,593,681 A | * | 7/1971 | Sernovitz ................ | 116/63 P |
| 4,345,816 A | * | 8/1982 | Nakai et al. ............. | 385/138 |
| 4,653,846 A | * | 3/1987 | Yamazaki et al. ........ | 385/138 |
| 5,109,445 A | * | 4/1992 | Jervis ..................... | 385/24 |
| 5,943,460 A | | 8/1999 | Mead et al. | |
| 6,181,865 B1 | * | 1/2001 | Saviano .................. | 385/139 |
| 6,238,103 B1 | * | 5/2001 | Ezawa .................... | 385/81 |
| 6,268,565 B1 | * | 7/2001 | Daoud .................... | 174/657 |
| 6,321,021 B1 | * | 11/2001 | Cairns et al. ............ | 385/138 |
| 6,608,960 B2 | * | 8/2003 | Cairns et al. ............ | 385/138 |
| 6,633,720 B1 | * | 10/2003 | Xu ......................... | 385/138 |
| 2007/0041686 A1 | * | 2/2007 | Wada et al. ............. | 385/92 |

FOREIGN PATENT DOCUMENTS

| | | |
|---|---|---|
| DE | 40 16 694 | 12/1991 |
| EP | 0383511 | 8/1990 |
| FR | 2612302 | 9/1988 |
| JP | 60-153005 | 8/1985 |
| WO | WO 2005/019893 | * 3/2005 |

OTHER PUBLICATIONS

International Search Report (in English & French).

* cited by examiner

*Primary Examiner*—Kevin S Wood
*Assistant Examiner*—John M Bedtelyon
(74) *Attorney, Agent, or Firm*—Antonelli, Terry, Stout & Kraus, LLP.

(57) ABSTRACT

The present invention relates to a sealing device for optical fiber, comprising in combination a plurality of conical jaws (4) with which optical fiber (1) is in line, a body including a corresponding female cone (3) intended to receive the jaws, a nut (6) screwed on the body so as to compress the jaws, a casing (10) linked to the body and covering the nut so as to form around it an at least partly confined volume, a filling material (9) intended to fill at least part of the volume, and wherein the material comprises solid fillers favouring sealing between the body, the jaws and the fiber.

19 Claims, 3 Drawing Sheets

SEALED FEEDTHROUGH ASSEMBLY FOR OPTICAL FIBER

FIELD OF THE INVENTION

The goal of the present invention is to allow continuity of a single or multimode optical fiber and to interpose a sealed barrier between two solid, liquid or gaseous media that can be different in terms of composition and pressure, and in which the optical fiber is placed.

The device is advantageously applied for insulation and protection of sensors and/or equipments in relation to a surrounding medium.

BACKGROUND OF THE INVENTION

Sealed feedthroughs for electric conductors have been known for a long time, and applications to optical sensors and optical fiber links are widespread. They require sealed feedthroughs providing passage of the optical signal and an insulation between two media.

Optical sealed feedthroughs available in the industry are based on the use of polymer compounds providing a mechanical link between the optical fiber and the mechanical support. This technology can only be implemented in the factory over a short optical fiber length.

The medium requirements in terms of pressure, nature of the fluids, temperatures, service life limit the use of certain polymer materials. Polymer materials are not inert. Their mechanical properties change with time, age, and they no longer act as sealed barriers.

Another optical fiber sealed feedthrough technology consists in using an optical. fiber locally coated with a metal deposit layer on the glass of the optical fiber. This metal deposit is used as a bonding base for a metal solder providing continuity and cohesion with the metalllic support. This technique requires preparation of the optical fiber and soldering that can only be carried out in the factory over a reduced optical fiber length since the optical fiber has to be slipped into the conduit of the support which is a passage about 0.2 mm in diameter and about 20 mm in length.

SUMMARY OF THE INVENTION

The present invention thus relates to a sealed feedthrough for optical fiber, characterized in that it comprises in combination a plurality of conical jaws with which the optical fiber is in line, a body comprising a corresponding female cone intended to receive said jaws, a nut screwed on said body so as to compress the jaws, a casing linked to the body and covering the nut so as to form around it an at least partly confined volume, a filling material intended to fill at least part of the volume, and in that the material comprises solid fillers favouring sealing between the body, the jaws and the fiber.

In the device, the fillers of said material can be metallic.

The largest surface of the conical jaws can be preferably on the high pressure side.

The body can comprise at least two female cones wherein two sets of jaws are arranged so as to form a double seal.

The conical sets can be arranged in opposition in relation to the axis of the fiber.

All the surfaces of each conical jaw can be coated with a layer of a ductile, metallic, organic or mineral material.

The coating can comprise gold.

Within the context of oil reservoir development, the invention can be used at the bottom of wells. In this case, it is necessary to arrange sealed optical fiber feedthroughs insulating the optical sensor or optical connector part from the optical fiber transmission line between the well bottom and the surface. Sealed feedthroughs are used every time a discontinuity is encountered due to a physical separation of media, such as a packer, or passages at the wellhead, whether subsea or aerial.

The performances of the optical sealed feedthroughs used for petroleum applications at well bottoms are particularly severe in terms of pressure that can reach 1500 bars, in terms of temperature than can be above 200° C., and considering the nature of the fluids, liquids or gas. Furthermore, a reliability above 10 years is required.

However, the present invention is not limited to petroleum applications, the optical sealed feedthroughs can also be used for industrial, chemical, nuclear applications, etc.

Of course, the sealed barrier must not affect data transmission through the core of the optical fiber.

The device according to the invention affords the following advantages:

- it uses no polymer compounds to provide sealing. Only a grease or compound is used, whose functions and nature are described hereafter,
- it is made up only of metallic elements positioned around the fiber and of screwed locking elements,
- it can be positioned on the fiber without having to cut the latter,
- it requires no manufacturing operations in the factory for the barrier element,
- a sealed feedthrough can be mounted on a petroleum site from assembled mechanical components.

BRIEF DESCRIPTION OF THE FIGURES

Other features and advantages of the present invention will be clear from reading the description hereafter of embodiments given by way of non limitative example, with reference to the accompanying figures wherein.

DETAILED DESCRIPTION

Figure 1:
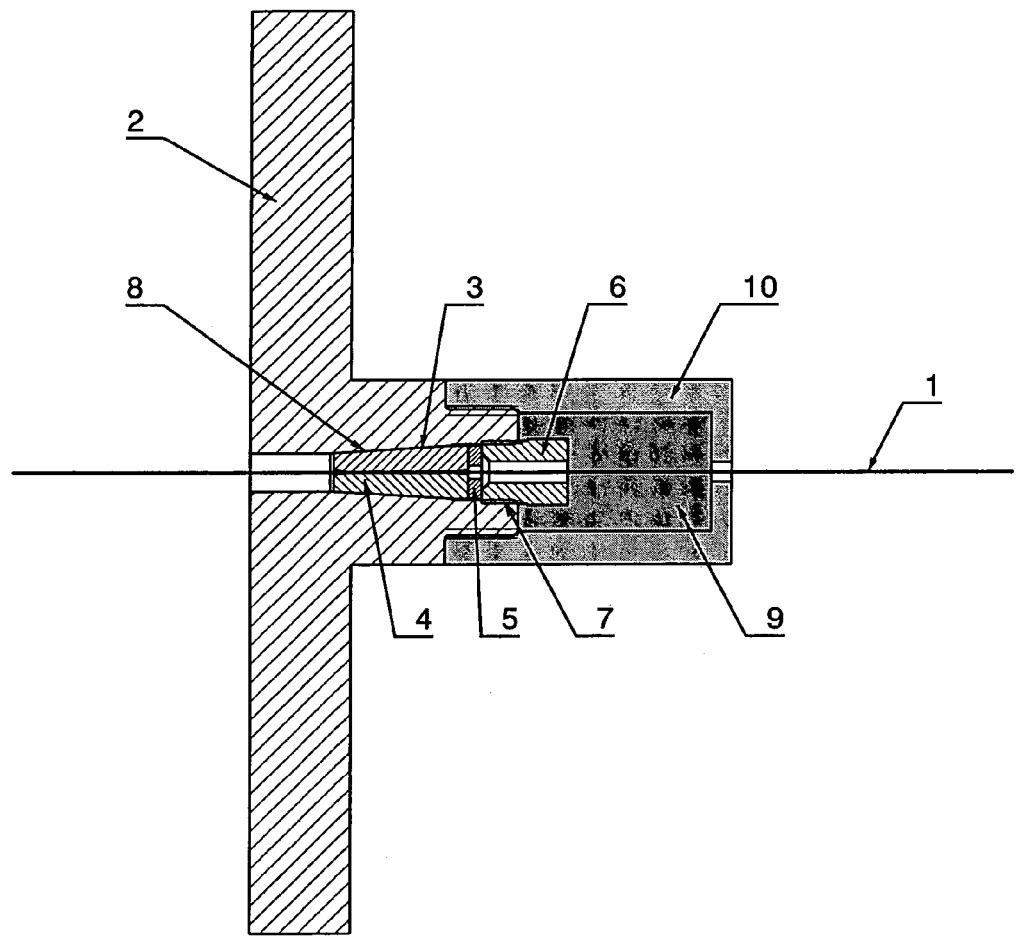
FIG. 1 shows in sectional view the mechanical elements of the device.

In FIG. 1, optical fiber 1 that passes through the sealed barrier is of single mode type (CEDI SMT A1310H for example), of outside diameter 155 µm. The section of the fiber comprises, from the inside to the outside, a fiber core 9.3 µm in diameter and a cladding thickness 125 µm in diameter. The outside polyimide coating is therefore 15 µm in diameter. The temperature of use of such a fiber is 300° C. maximum.

There are also metal-coated optical fibers for use up to 700° C. (manufactured by Oxford Electronic for example).

According to the invention, the sealed feedthrough consists of the following mechanical elements:

An outside body 2 secured to the element linked to the part to be insulated, for example a measurement sensor housing (Pressure and/or Temperature), an optical connector, or any other element such as a packer or a subsea wellhead.

Outside body 2 comprises a female element 3 of bushing type, conically machined with a definite angle and a specific machining accuracy and surface coating.

Figure 5A:
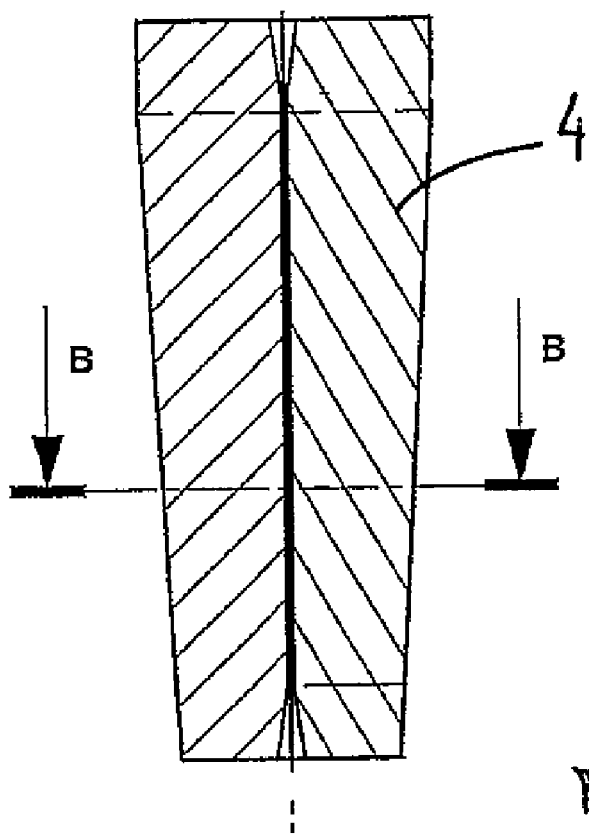
FIG. 5a and 5b show the shaped of the jaws of the device.
Figure 5B:
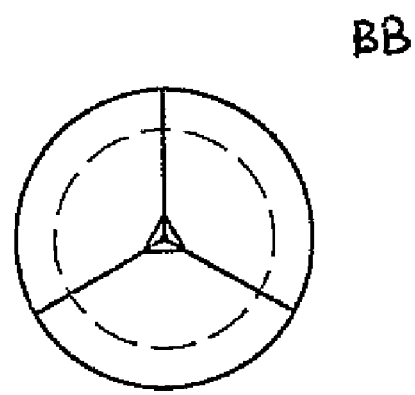

The fiber locking means preferably comprise three jaws 4 whose conical shape is complementary to the female part of outside element 3. The shape of the trhee jaws is shown in FIGS. 5*a* and 5*b*.

The three jaws 4 are machined with definite accuracy so as to perfectly clamp the optical fiber. The bore provided along the axis of the jaws is in contact with the coating covering the outer surface of the optical fiber, which can be polyimide or metal. This coating is generally about 15 μm thick, which explains the accuracy level required for machining conical bushing 3 and jaws 4.

Jaws 4 are positioned by a washer 5 so as to have a perfectly plane contact as they are pushed into the conical housing of bushing 3 by a male nut 6. Nut 6 is screwed in outer part 2 by means of a thread 7. Locking of the nut provides a thrust load, by means of washer 5, on conical jaws 4 so as to obtain metal-metal sealing between the jaws and the female cone of bushing 3.

In order to provide yet better sealing (which is merely optional), a metal plating 8 (gold for example) can be deposited over the entire outer surface of jaws 4 and on the inner surface of the cone complementary to bushing 3. This soft metal (gold for example) improves by its creep the metal-metal contact between the conical surfaces and contact between the plane surfaces between each one of the jaws.

The conical jaws are arranged in such a way that the force applied by nut 6 and the pressure of the outside medium push the great section of the cone so as to increase the contact effect and thus to increase sealing under pressure.

A material 9 of grease type, or equivalent (referred to as compound by specialists), is arranged on the part of the device subjected to pressure, in the volume defined by casing 10 screwed on outer body 2. The function of this material 9 is to fill in the micro-passages likely to exist between the jaws, between the jaws and the optical fiber, or between the conical part of the jaws and the outer part. The presence of micro-spaces to be filled in is locally possible due to machining irregularities in complementary conical parts 2 and 4. These spaces remain limited, of the order of some microns. They have to be definitively filled in to provide metal-metal sealing. The solution is identical to the similar problem of making up tubings where the pipe elements are made up end to end to provide a sealed continuity between the bottom (production zone) and the surface. The pipe threads are coated with a thick grease (API compound) that has the specific feature of containing very fine metal micronized particles associated with a binder such as a hydrocarbon-based grease. The metal particles and the binder fill in the small interstices contained between the male and female threads so as to provide metal-metal sealing of the threads. This principle is thus considered for filling in the micro-interstices (much smaller than those encountered with the threads) so as to definitively seal the feedthrough assembly with optical fiber. The hydraulic pressure applied to check the resistance of the whole of the feedthrough will force the metal micro-particles into the micro-interstices. The pressure applied can be the maximum operating pressure, ranging between 1000 and 1500 bars for example.

The grease-based compound material allows the sealed feedthrough assembly to be easily dismounted.

Another type of material can be used, for example based on glue, which provides locking of the nuts. Gluing the parts of the feedthrough provides sealing. However, dismounting is then more difficult and requires heating the bonds so as to destroy the glue.

Figure 2:
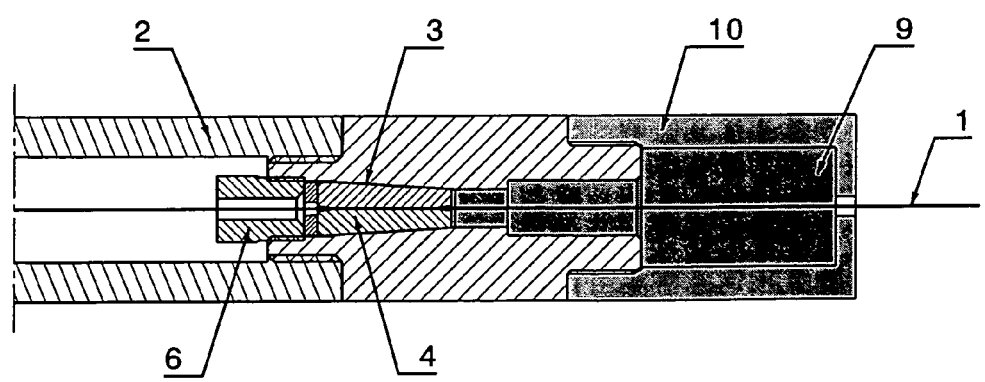
FIG. 2 shows a variant of the device.

According to FIG. 2, the device can comprise oppositely arranged jaws, i.e. jaws for which the outside pressure tends to release the conical jaws instead of pushing them into the cone of outer support 2. In this case, nut 6 which pushes the conical jaws into the support applies a force that is much greater than the effect due to the pressure to maintain metal-metal sealing.

Figure 3:
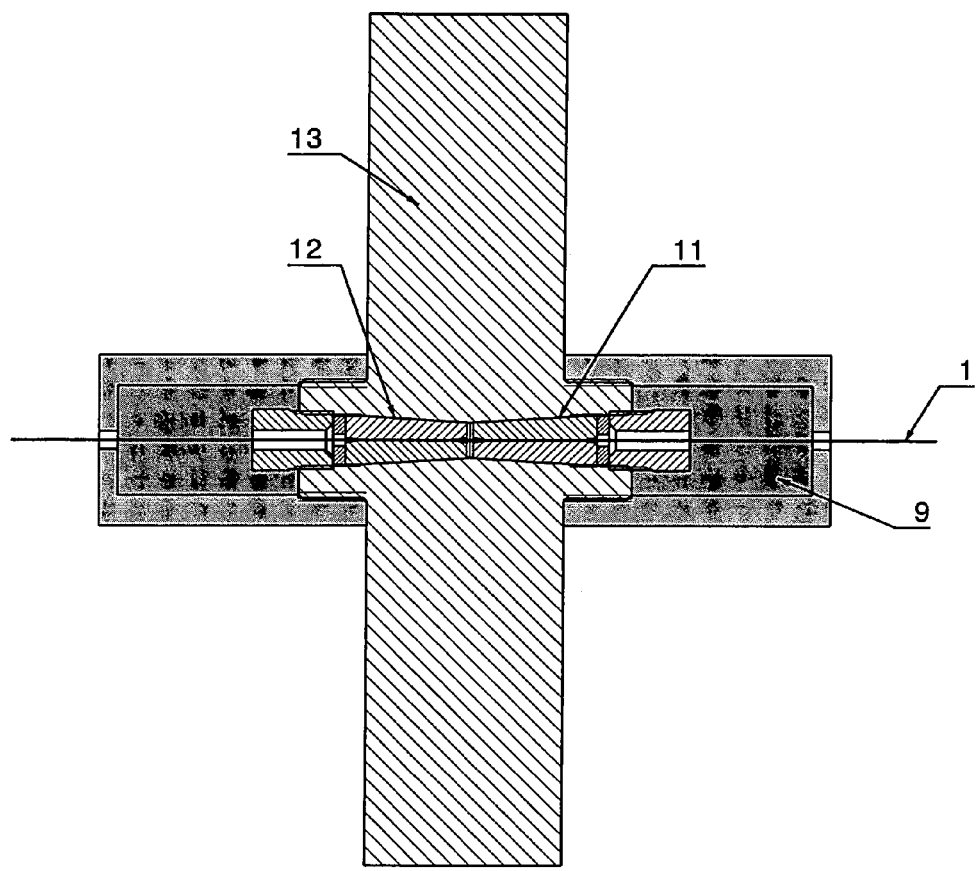
FIG. 3 illustrates an implementation of the invention.

According to FIG. 3, the invention is advantageously applied to a double sealed feedthrough or bulkhead feedthrough 13 wherein two sets of jaws 11 and 12 are arranged top to bottom or in opposite directions. Outside pressures P1 and P2 applied on either side of wall 13 can be very different. These pressures are applied equally to both sides of the conical elements oriented in such a way that the pressures tend to increase the application forces on the respective cones.

The invention is not limited to this assembly, but it also applies to a double sealed feedthrough wherein both sets of jaws are arranged in the same direction, and the outside pressure can be applied indiscriminately on both sides.

Figure 4:
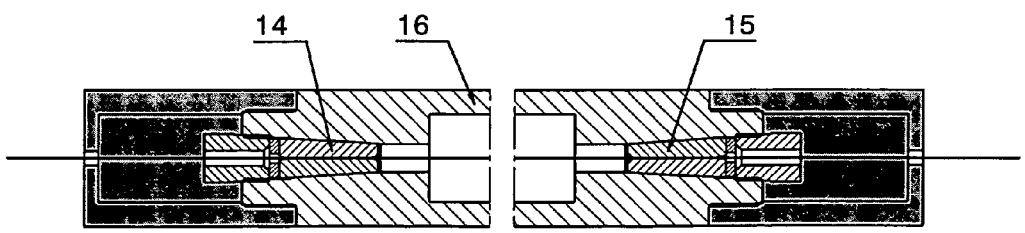
FIG. 4 shows another variant.

FIG. 4 illustrates a specific embodiment of the device wherein the optical fiber has to run through an equipment, a measuring equipment for example, or a packer. Both feedthroughs 14 and 15 are arranged at the ends of a tube 16.

Test

The prototype assembly used is in accordance with that of FIG. 4 with two sealed feedthroughs.

The optical fiber is perfectly positioned between the jaws, the washer, the slightly screwed, then slightly unscrewed nut. The cone and the jaws being upside down, the jaws are pushed back so as to be pressed against the washer. One checks that the optical fiber remains well centered, then the nut is screwed so as to push the jaws into the cone. The nut is locked at the predetermined torque according to the mechanical characteristics. One checks again that the optical fiber is well centered and not gripped between the jaws.

A metal-laden high temperature grease type compound material is used.

The device is subjected to a hydraulic pressure:
700 bars at ambient temperature, for 3 days: no loss;
1250 bars at 200° C.: sealed for at least 15 days.

The invention claimed is:

1. A feedthrough assembly for optical fiber, comprising:
    a plurality of conical jaws within which an optical fiber can be sealed in line;
    a body comprising a corresponding female cone to receive the jaws;
    a nut screwed on the body so as to compress the jaws;
    a casing linked to the body and covering the nut so as to form around it an at least partly confined volume; and
    a filling material to fill at least part of the volume wherein at least a surface of the conical jaws adjacent the female cone is metal, the filling material comprises solid fillers favoring sealing between the body, the jaws and the optical fiber, and the fillers of the filling material are metallic.

2. An assembly as claimed in claim 1, wherein the largest surface of the conical jaws is oriented towards a high pressure side of the sealed assembly.

3. An assembly as claimed in claim 1, wherein the body comprises at least two female cones wherein two sets of jaws are arranged so as to form a double seal.

4. An assembly as claimed in claim 3, wherein the conical sets are arranged in an opposite direction in relation to the axis of the fiber.

5. An assembly as claimed in claim 4, wherein the plurality of conical jaws comprises three jaws assembled to have an outside conical shape corresponding to a shape of the corresponding female cone.

6. An assembly as claimed in claim 3, wherein each set of jaws comprises three jaws assembled to have an outside shape corresponding to a shape of the corresponding female cone.

7. An assembly as claimed in claim 1, wherein all the surfaces of each conical jaw are coated with a layer of a ductile material.

8. An assembly as claimed in claim 7, wherein the coating is a metal coating.

9. An assembly as claimed in claim 1, wherein the conical jaws are made of metal.

10. An assembly as claimed in claim 9, wherein the conical jaws are machined to form a clamping surface for the optical fiber.

11. An assembly as claimed in claim 10, wherein the body is made of metal.

12. An assembly as claimed in claim 9, wherein the body is made of metal.

13. An assembly as claimed in claim 9, wherein all the surfaces of each conical jaw are coated with a layer of a ductile material.

14. An assembly as claimed in claim 1, wherein the conical jaws are machined to form a clamping surface for the optical fiber.

15. An assembly as claimed in claim 14, wherein the body is made of metal.

16. An assembly as claimed in claim 14, wherein all the surfaces of each conical jaw are coated with a layer of a ductile material.

17. An assembly as claimed in claim 1, wherein the plurality of conical jaws comprises three jaws assembled to have an outside conical shape corresponding to a shape of the corresponding female cone.

18. An assembly as claimed in claim 1, wherein the body is made of metal.

19. An assembly as claimed in claim 1, wherein the conical jaws are dimensioned to receive an optical fiber having an outside diameter of 155 μm.

* * * * *